United States Patent
Ohba et al.

(10) Patent No.: US 8,670,046 B2
(45) Date of Patent: Mar. 11, 2014

(54) IMAGE DATA CREATION SUPPORT DEVICE AND IMAGE DATA CREATION SUPPORT METHOD

(75) Inventors: Akio Ohba, Kanagawa (JP); Takeshi Yamagishi, Kanagawa (JP); Hiroyuki Segawa, Kanagawa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/511,408

(22) PCT Filed: Jul. 27, 2010

(86) PCT No.: PCT/JP2010/004774
§ 371 (c)(1),
(2), (4) Date: Jul. 26, 2012

(87) PCT Pub. No.: WO2011/064918
PCT Pub. Date: Jun. 3, 2011

(65) Prior Publication Data
US 2012/0281119 A1 Nov. 8, 2012

(30) Foreign Application Priority Data
Nov. 24, 2009 (JP) ................. 2009-266666

(51) Int. Cl.
*H04N 5/76* (2006.01)
*H04N 5/262* (2006.01)

(52) U.S. Cl.
USPC ............ 348/231.3; 348/240.2; 348/240.99; 348/231.2

(58) Field of Classification Search
USPC ............................. 348/208.12, 345
See application file for complete search history.

(56) References Cited

U.S. PATENT DOCUMENTS 6,563,999 B1 5/2003 Suzuoki
6,822,676 B1 11/2004 Kurosawa
(Continued)

FOREIGN PATENT DOCUMENTS

JP 05-181949 * 7/1993
JP 5181949 A 7/1993
(Continued)

OTHER PUBLICATIONS

International Search Report for the corresponding PCT Application No. PCT/JP2010/004774, dated Nov. 16, 2010.
(Continued)

*Primary Examiner* — Roberto Velez
*Assistant Examiner* — Stephen Coleman
(74) *Attorney, Agent, or Firm* — Matthew B. Dernier, Esq.; Gibson & Dernier LLP

(57) ABSTRACT

A user enters an input for selecting an image-capturing mode. The user then captures the image of a target with a desired zoon factor as a target image. An image-capturing device determines a zoom factor for an image to be captured starting from the target image and then captures an image while zooming out to the determined zoom factor. A process of changing the zoom factor and capturing an image is repeated until the smallest zoom factor among determined zoom factors is used. When image capturing of an image of the smallest zoom factor is completed, metadata is created that includes the respective zoom factors of images and relative position information of the images, and the metadata is stored in a memory unit in relation with the data of the captured images.

17 Claims, 12 Drawing Sheets

(56) References Cited

U.S. PATENT DOCUMENTS

| | | | |
|---|---|---|---|
| 2004/0189856 A1* | 9/2004 | Tanaka | 348/345 |
| 2007/0081729 A1 | 4/2007 | Ogawa | |
| 2008/0031610 A1* | 2/2008 | Border et al. | 396/89 |

FOREIGN PATENT DOCUMENTS

| | | | |
|---|---|---|---|
| JP | 11-205653 | * | 7/1999 |
| JP | 11205653 A | | 7/1999 |
| JP | 2004062671 A | | 2/2004 |
| JP | 2005-275797 | * | 10/2005 |
| JP | 2005275797 A | | 10/2005 |
| JP | 2007102634 A | | 4/2007 |

OTHER PUBLICATIONS

International Preliminary Examination Report on Patentability with Written Opinion for the corresponding PCT Application No. PCT/JP2010/004774, dated Jun. 12, 2012.

Office Action for corresponding Japanese Patent Application No. 2009-266666, dated Apr. 2, 2013.

* cited by examiner

IMAGE DATA CREATION SUPPORT DEVICE AND IMAGE DATA CREATION SUPPORT METHOD

TECHNICAL FIELD

The present invention relates to a creation support device and creation support method of image data used in an image processing technology for enlarging and reducing a display image.

BACKGROUND ART

Home entertainment systems are proposed capable of playing back moving images as well as running game programs. In home entertainment systems, a GPU generates three-dimensional images using polygons (see, for example, patent document No. 1).

Meanwhile, a technology is proposed capable of enlarging/reducing a displayed image or moving the image upward, downward, leftward, or rightward, using tile images of a plurality of resolutions generated from a digital image such as a high-definition photo. In this image processing technology, the size of an original image is reduced in a plurality of stages to generate images of different resolutions so as to represent the original image in a hierarchical structure where the image in each layer is divided into one or a plurality of tile images. Normally, the image with the lowest resolution comprises one tile image. The original image with the highest resolution comprises the largest number of tile images. An image processing device is configured to enlarge or reduce a displayed image efficiently such that an enlarged view or reduced view is presented efficiently by switching a currently used tile image to a tile image of a different layer.

[patent document 1] U.S. Pat. No. 6,563,999

Mobile terminals recently available are provided with a display screen of an increasing larger size. It has therefore become possible to display high-definition images regardless of the type of information processing device. Thus, people can easily access various types of content appealing to the eye. At the same time, a demand for creating appealing content has been growing. However, for example, when creating image display content using image data having the above-stated hierarchical structure, there is a problem that acquisition of a material image and creation of content data become more complex as a desire for effective production grows, requiring additional expertise and effort.

SUMMARY OF THE INVENTION

In this background, a purpose of the present invention is to provide a technology capable of easily creating image data that allows for various expressions.

One embodiment of the present invention relates to an image data creation support device. The image data creation support device for supporting creation of image data used by a display device in which data of a plurality of images that have been captured at a plurality of different zoom factors are interchangeably used as the data of an image to be displayed at a predetermined scale ratio when enlarging or reducing a display image, comprises: an input information acquisition unit configured to receive an input specifying a desired zoom factor for the image of an object from a user; an image-capturing unit configured to capture a plurality of images for displaying, that include the object, at a plurality of zoom factors starting with the zoom factor specified by the user which is received by the input information acquisition unit; and a metadata creation unit configured to acquire metadata which associates the plurality of images captured by the image-capturing unit with one another and includes the the zoom factors of the respective images that determine an order and timing for the switching at the time of display, add the metadata to the image data, and then store the metadata in a memory device.

Another embodiment of the present invention relates to an image data creation support method. The image data creation support method for supporting creation of image data used by a display device in which data of a plurality of images that have been captured at a plurality of different zoom factors are interchangeably used as the data of an image to be displayed at a predetermined scale ratio when enlarging or reducing a display image, comprises: receiving an input specifying a desired zoom factor for the image of an object from a user; capturing a plurality of images for displaying, that include the object, at a plurality of zoom factors starting with the zoom factor specified by the user; acquiring metadata which associates the plurality of captured images with one another and includes the zoom factors of the respective images that determine an order and timing for the switching at the time of display; and creating, as the image data, hierarchical data obtained by hierarchizing the plurality of images in the order of zoom factors, then analyzing the images, extracting respective feature points of an identical object in the images, and aligning the images in respective layers in the hierarchical data so that the respective positions of the feature points have correspondence when the images in respective layers have an identical size by enlarging or reducing and then storing in a memory device.

Optional combinations of the aforementioned constituting elements, and implementations of the invention in the form of methods, apparatuses, systems, computer programs, data structures, and recording mediums may also be practiced as additional modes of the present invention.

According to the present invention, creation of image data that allows for various expressions can be realized with a minimum burden on the user.

DETAILED DESCRIPTION OF THE INVENTION

Image data created in the embodiment has a hierarchical structure obtained by hierarchizing the data of an image with a plurality of resolutions or an image captured with a plurality of zoom factors. A description will be given of a mechanism for displaying image data having a hierarchical structure.

Figure 1:
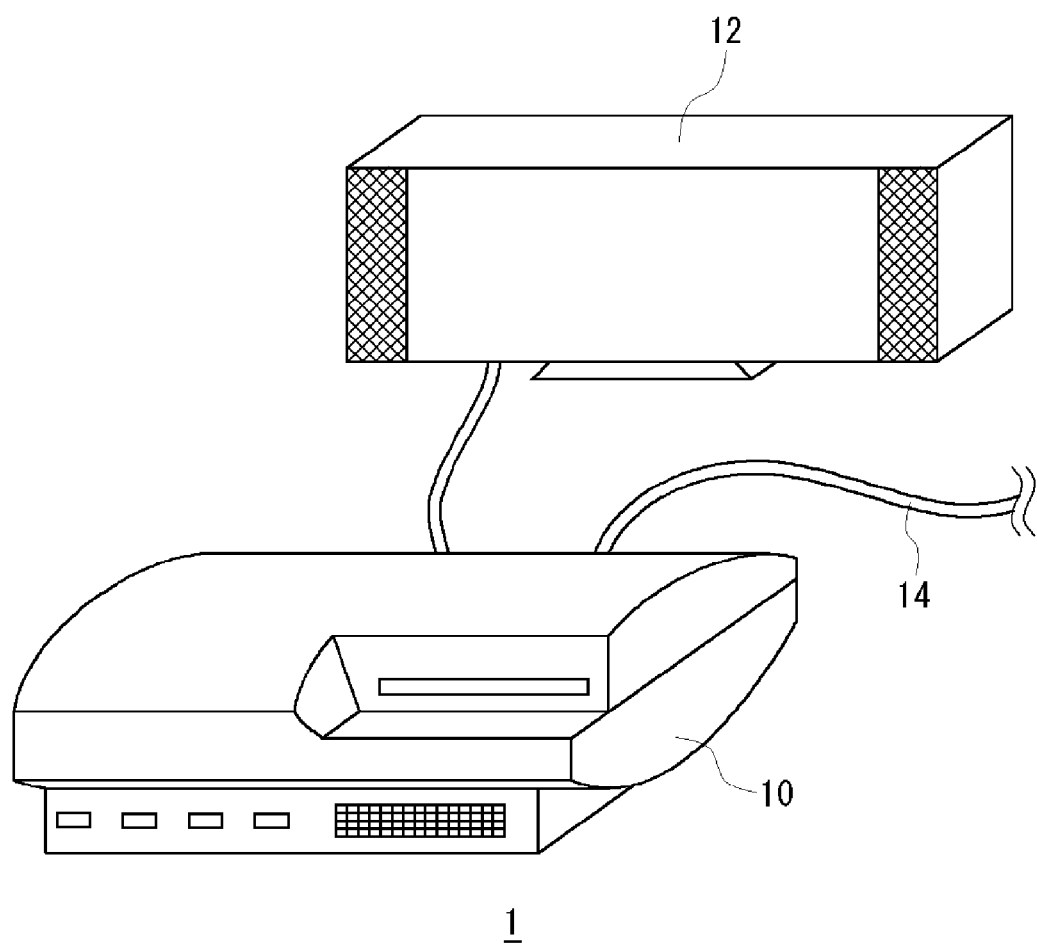
FIG. 1 is a diagram illustrating a usage environment of an image processing system according to the embodiment of the present invention.

FIG. 1 is a diagram illustrating a configuration example of an image processing system that displays image data created in the embodiment. An image processing system 1 comprises an image processing device 10 for performing processing related to displaying an image and a display device 12 for outputting a processing result by the image processing device 10. The display device 12 may be a TV having a display for outputting an image and a speaker for outputting a sound. The display device 12 may be connected to the image processing device 10 via a wired cable or wirelessly via a wireless LAN (Local Area Network) or the like.

In the image processing system 1, the image processing device 10 may be connected to an external network such as the Internet via a cable 14 and may download and acquire software or the like of content containing hierarchized compressed image data. The image processing device 10 may be connected to an external network via wireless communication. The image processing device 10 may be a game device or a personal computer so as to achieve a function described hereinafter by loading software from various recording media. The image processing device 10 may have a function of performing processing other than the display of an image as described hereinafter, e.g., sound processing, execution of a game, connection to a network, etc.

When the user enters to an input device an input requesting enlarging/reducing of a display area and scrolling in a vertical or horizontal direction while looking at an image displayed on the display device 12, the input device transmits a request signal requesting displacement and enlarging/reducing of the display area to the image processing device 10, accordingly. According to the signal, the image processing device 10 changes an image on the screen of the display device 12.

Figure 2:
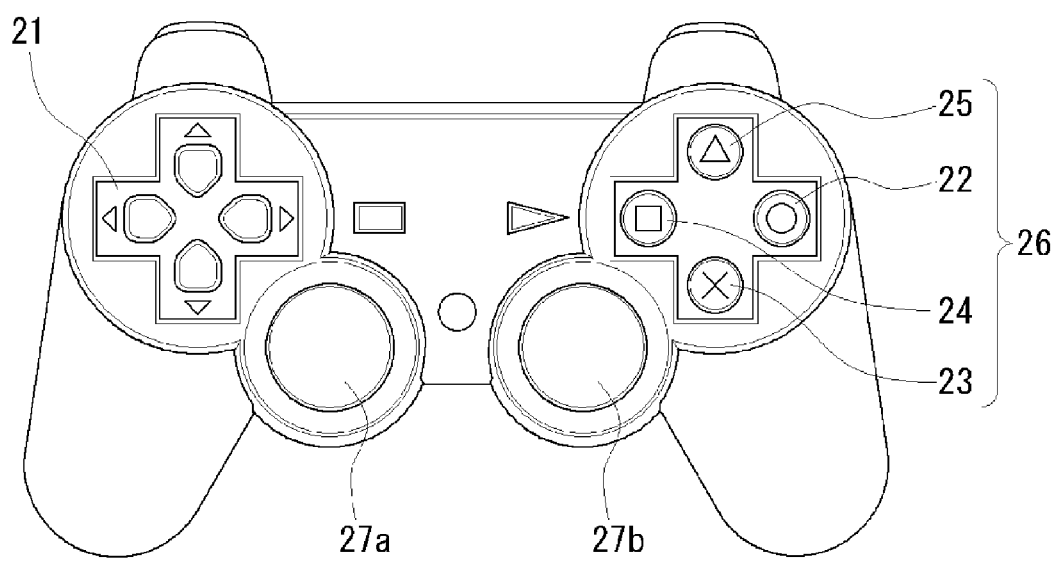
FIG. 2 is a diagram illustrating the exterior configuration of an input device applicable to the image processing system shown in FIG. 1.

FIG. 2 illustrates an exemplary exterior configuration of the input device 20. The input device 20 is provided with directional keys 21, analog sticks 27a and 27b, and operation buttons 26 including four types of buttons as operation means that can be operated by the user. The operation buttons 26 that include four types of buttons comprise a circle-marked button 22, an x-marked button 23, a square-marked button 24, and a triangle-marked button 25. In the image processing system 1, functions for entering a request for enlarging/reducing a display area and for entering a request for scrolling upward, downward, leftward, or rightward are assigned to the operation means of the input device 20.

For example, the function of entering the request for enlarging/reducing a display area is assigned to the right analog stick 27b. The user can enter a request for reducing a display area by pulling the analog stick 27b toward the user and enter a request for enlarging the display area by pushing the analog stick 27b away from the user. A function of entering the scrolling of a display area is assigned to the directional keys 21. By pressing the directional keys 21, the user can enter a request for scrolling in the direction in which a directional key 21 is pressed. The function of entering a request for moving a display area may be assigned to an alternative user operation means. For example, the function of entering a request for scrolling may be assigned to the analog stick 27a.

The input device 20 has the function of transmitting to the image processing device 10 an input signal requesting to move a display area. In the embodiment, the input device 20 is configured to be capable of communicating wirelessly with the image processing device 10. The input device 20 and the image processing device 10 may establish a wireless connection using Bluetooth (registered trademark) protocol or IEEE 802.11 protocol. The input device 20 may be connected to the image processing device 10 via a cable so as to transmit to the image processing device 10 a signal requesting to move a display area accordingly.

Figure 3:
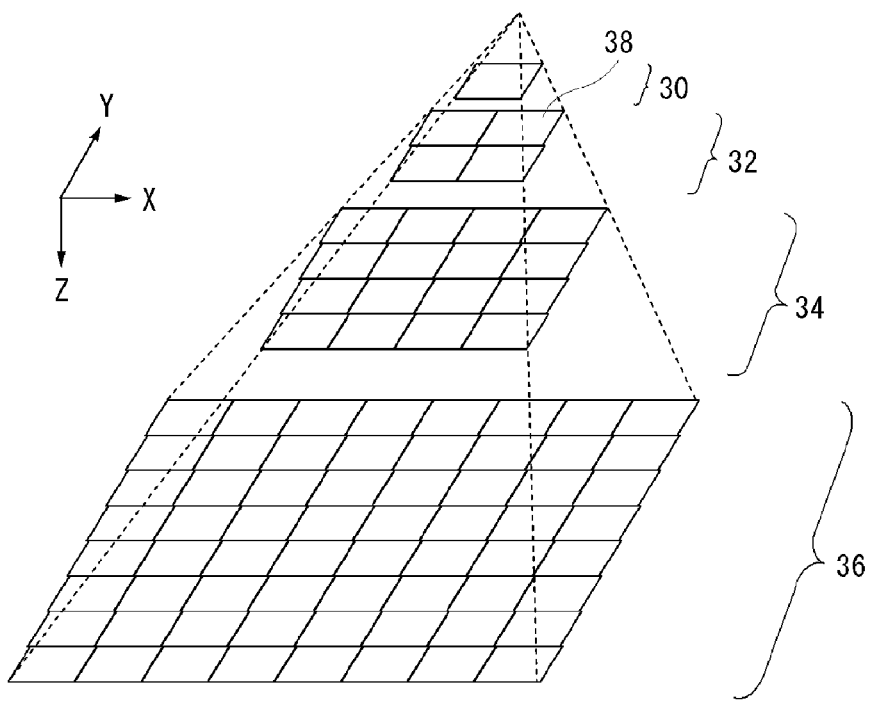
FIG. 3 is a diagram illustrating an example of the hierarchical structure of image data used in the embodiment.

FIG. 3 shows an example of the hierarchical structure of image data used in the embodiment. The image data has a hierarchical structure comprising a 0-th layer 30, a first layer 32, a second layer 34, and a third layer 36 in the direction of depth (Z axis). While the figure only shows four layers, the number of layers is nonrestrictive. Hereinafter, image data having such a hierarchical structure will be referred to as "hierarchical data."

The hierarchical data shown in FIG. 3 has a quadtree hierarchical structure. Each layer comprises one or more tile images 38. All of the tile images 38 are formed to have the same size having the same number of pixels, for example, 256 by 256 pixels. The image data in the respective layers are representations of an image in different resolutions. The resolution grows lower in the following order: the third layer 36, the second layer 34, the first layer 32, and the 0-th layer 30. For example, the resolution in an Nth layer (N is an integer equal to or greater than 0) may be ½ the resolution of the (N+1)th layer in both the horizontal (X axis) direction and the vertical (Y axis) direction.

In FIG. 3, all the tile images are drawn in the respective layers. However, tile images may be prepared only for a partial area in, for example, a high resolution image in the third layer 36 or the like. When enlarging the area for which tile images are not prepared, an image in a corresponding area in an upper layer is enlarged for display or set so that the image cannot be enlarged. As described, even when a tile image is prepared only for a part of an area, switching of the layers at the time of display can be seamlessly realized by aligning images in corresponding areas in upper and lower layers, for example, a single tile image in the lower right of the second layer 34 and 2 by 2 tile images in the lower right of the third layer 36.

In the image processing device 10, the hierarchical data is compressed in a predefined compression format and is stored in a storage device. When image display content is activated, the hierarchical data is read from the storage device and decoded. The image processing device 10 may have a decoding function compatible with a plurality of types of compression formats. For example, the image processing device 10 is capable of decoding compressed data in a S3TC format, a JPEG format, and a JPEG2000 format. In the hierarchical data, a compression process may be performed for each tile image. Alternatively, the compression process may be performed for a plurality of tile images included in the same layer or in a plurality of layers.

As shown in FIG. 3, the hierarchical structure of the hierarchical data is configured such that the horizontal direction is defined along the X axis, the vertical direction is defined along the Y axis, and the depth direction is defined along the Z axis, thereby building a virtual three-dimensional space. The image processing device 10 derives the amount of displacement of the display area by referring to the signal, supplied from the input device 20, requesting to move the display area. Then the image processing device 10 uses the amount of displacement to derive the coordinates at the four corners of a frame (frame coordinates) in the virtual space. The frame coordinates in the virtual space are used to generate a display image. Instead of the frame coordinates in the virtual space, the image processing device 10 may derive information identifying the layer and the texture coordinates (UV coordinates) in the layer.

Image data of respective layers included in the hierarchical data is discretely located in the z-axis direction in the virtual space. Therefore, when an image is to be displayed with a particular scale factor between the scale factors of discretely located layers and thus there exists no image data of the particular scale factor, image data of a layer in the vicinity of the scale factor in the z-axis direction is used. For example, the scale factor of a display image is in the vicinity of the second layer 34, the display image is generated while using the image data of the second layer. In order to implement this, a switching boundary of source images is defined between respective layers, for example, at the midpoint. If a scale factor changes and crosses over the switching boundary, the image data to be used for creating the display image is switched so that an enlarged or reduced image is displayed.

Figure 4:
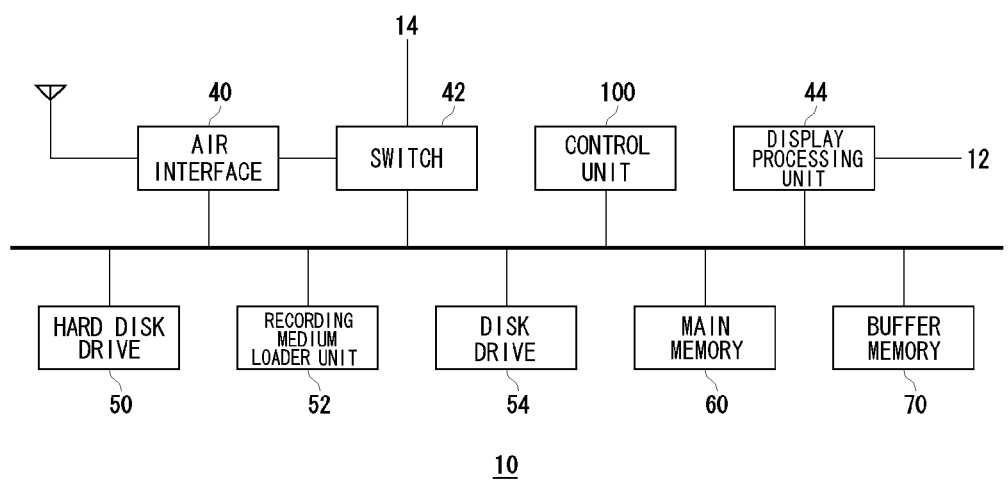
FIG. 4 is a diagram illustrating the configuration of an image processing device that displays image data created in the embodiment.

FIG. 4 shows the configuration of the image processing device 10. The image processing device 10 comprises an air interface 40, a switch 42, a display processing unit 44, a hard disk drive 50, a recording medium loading unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 is connected to an external network via the cable 14 so as to receive data for, for example, content from a server. The switch 42 is connected to the air interface 40. The air interface 40 is connected to the input device 20 using a predefined wireless communication protocol. A signal input by the user via the input device 20 is supplied to the control unit 100 via the air interface 40 and the switch 42.

The hard disk drive 50 functions as a storage device for storing data. Various data items received via the switch 42 is stored in the hard disk drive 50. When a removable recoding medium such as a memory card is loaded, the recording medium loading unit 52 reads out data from the removable recoding medium. When a ROM disk is loaded, the disk drive 54 drives and recognizes the ROM disk so as to read data. The ROM disk may be an optical disk or a magneto-optical disk. The content file may be stored in the recording medium.

The main controller 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The main controller 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70.

The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing by operating a plurality of SPUs in parallel. The display processing unit 44 is connected to the display device 12 and outputs a result of image processing in accordance with user request.

In order to smoothly move a display image, the image processing device 10 loads at least a part of the compressed image data from the hard disk drive 50 into the main memory 60 in advance. Further, the image processing device 10 is configured to predict an area to be displayed in the future based on the user's request to move the display area, and decode a part of the compressed image data loaded into the main memory 60 and store the decoded data in the buffer memory 70. This allows for an immediate switch of an image to be used for the generation of the display image at a following timing as necessary. A plurality of sets of hierarchical data may be provided for display, and the display image may go back and forth between the hierarchical data sets.

Figure 5:
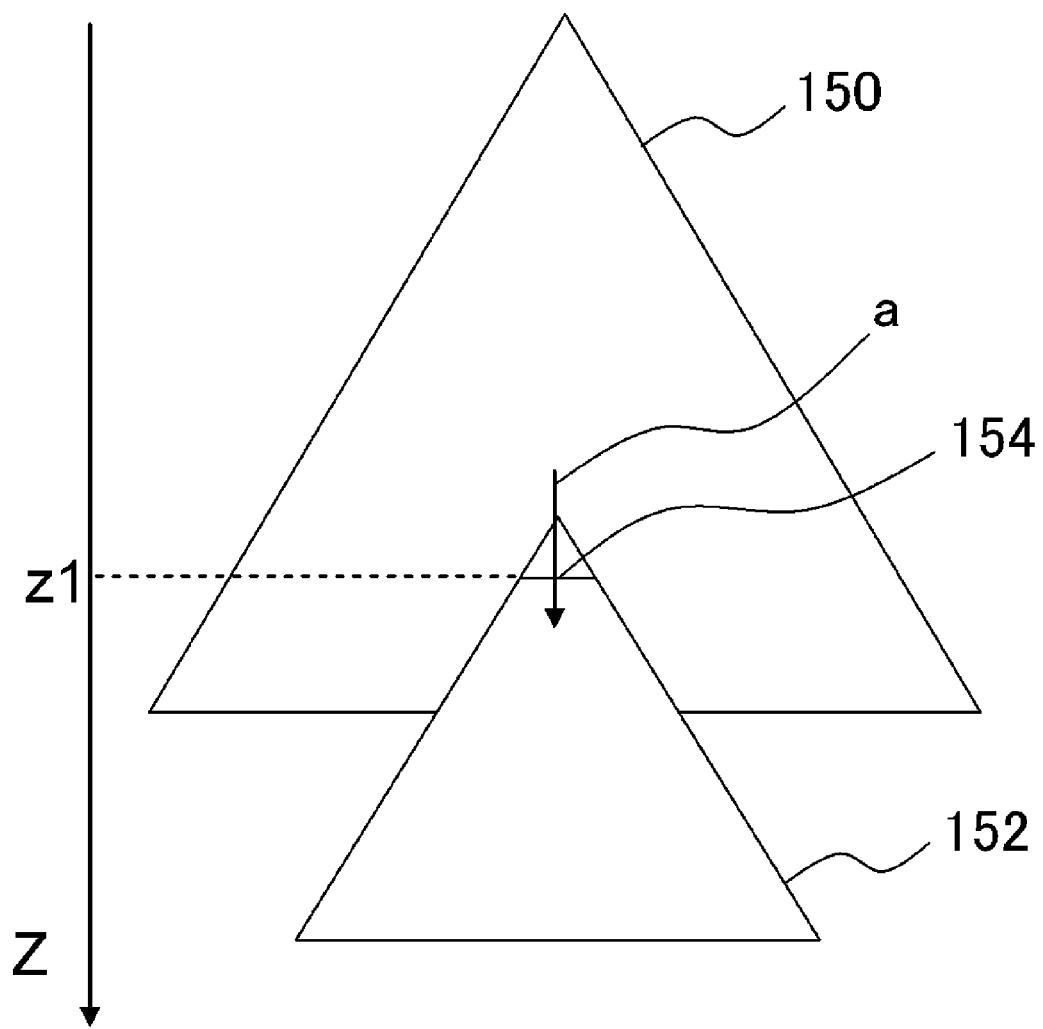
FIG. 5 is a diagram schematically illustrating a relationship among a plurality of sets of hierarchical data to be created in the embodiment.

FIG. 5 schematically shows a relationship among a plurality of sets of hierarchical data used for display according to the embodiment. In the figure, two triangles indicate different hierarchical data 150 and 152. Each of the hierarchical data 150 and 152 is actually configured such that a plurality of image data sets of different resolutions are discretely located along the Z-axis in the figure, as shown in FIG. 3. When the user requests to enlarge/reduce a display area via the input device 20, the display area moves in the z-axis direction in the figure. Meanwhile, when the user requests to move the display area up, down, left, or right, the display area moves on the horizontal plane in the figure. In such a virtual space, the two sets of hierarchical data 150 and 152 establish image data where two sets of data overlap as shown in the figure.

When the user continuously requests for enlargement in a certain area while an image of the hierarchical data 150 is being displayed using such image data, the display area enters the area of the hierarchical data 152 indicated by an arrow a. This operation switches data used for creating the display image from the hierarchical data 150 to the hierarchical data 152. This process can be implemented by modifying the hierarchical data to be loaded to the main memory 60 in the processing steps of displaying an image described so far.

The resolution and position of the image when switching the hierarchical data 150 and 152 are predefined in order to establish image data comprising a plurality of hierarchical data sets as shown in FIG. 5. This definition is shown as a line 154 in FIG. 5. In this way, the amount of overlap between the hierarchical data sets can be determined. In the illustrated example, switching from the hierarchical data 150 to the hierarchical data 152 takes place at the resolution z1 defined along the z-axis and the position represented by the line 154. Hereinafter, switching between hierarchical data sets are referred to as "link". Images of respective hierarchical data sets to be switched may be of a same image of different resolutions, or may be completely different images.

As an alternative to the switching of the display image to that of the hierarchical data 152, other processes such as playing back a moving image, playing back a sound, processing on a display image, and moving a display area may be performed. In this case, a link area for the hierarchical data 150 is predetermined in a similar manner as that of the line 154, and if a viewpoint reaches the area, a process that has been associated with the point is activated.

In this way, a mode can be realized where the user moves the display area while looking at an image of the hierarchical data 150 such that, when the display area reaches the link area, an image or information associated to the area is displayed or an associated moving image is played back. For example, effects for display can be realized that allow, when a display area is enlarged so as to show an image of the entire picture of a person, a face, and an eye in the said order, the display area to be further enlarged such that the display is switched to show another world reflected in the eye and such that an object in the world starts moving. A link to a plurality of hierarchical data sets may be defined for one hierarchical data. Alternatively, to a hierarchical data set of the destination of the link, a link to another hierarchical data set may be further defined.

When displaying an image of such hierarchical data, an advantage of the data structure can be taken more as a variable range in the z-axis, that is, in the direction of the resolution becomes larger. As described above, regardless of whether or not there is a link, when expressing an image containing a same object in a plurality of layers, a display can be switched seamlessly without the object being misaligned in layers by aligning the position of the object in an corresponding area in an upper layer with that in a lower layer, so that various effects as those shown above can be achieved.

However, if the images that form hierarchical data are pictures or moving images obtained by capturing images that contain a same object with different zoom factors, it is highly likely that there is a change in the weather or image-capturing conditions, displacement of a subject, or the like while capturing the image, thus changing the coloring and compositions thereof. The work of aligning the same object in images, captured separately as described above, through layers or in a layer requires a huge amount of effort. The present embodiment supports reducing the burden of a creator in a mode where pictures, moving images, or the like are captured to create hierarchical data. In the following explanation, a plurality of hierarchical data sets to which a link is set are sometimes referred to as "hierarchical data," generically.

Figure 6:
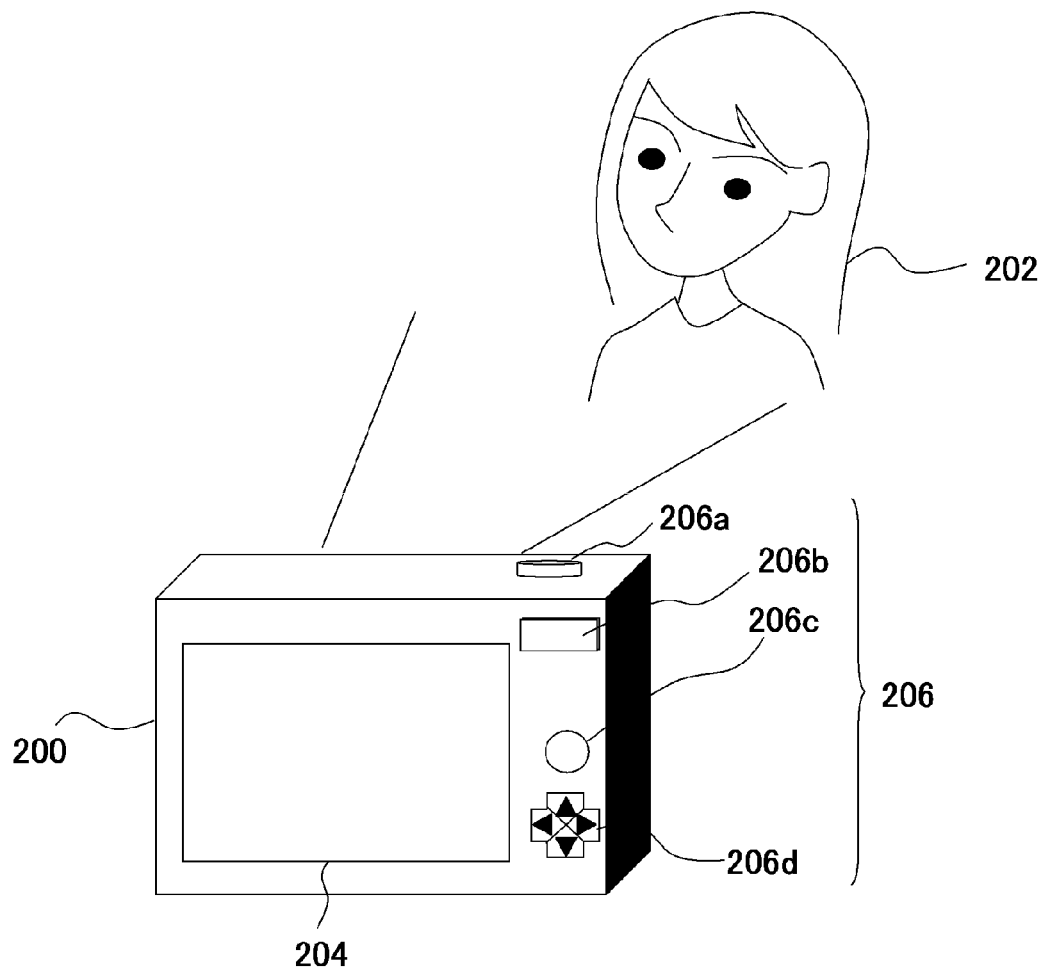
FIG. 6 is a diagram illustrating a form of use of an image-capturing device for supporting image data creation according to the embodiment.

FIG. 6 illustrates a form of use of an image-capturing device for supporting image data creation according to the embodiment. An image-capturing device 200 has a configuration similar to those of commonly-used digital cameras, digital video cameras, etc., in appearance and includes a function of capturing the image of a subject 202. Therefore, the image-capturing device 200 includes a lens and a mechanism such as a function of changing a zoom factor, which are provided in a commonly-used camera, on the side of the subject 202 (not shown). The image-capturing device 200 further includes a display 204 for displaying an image being captured by the lens and for presenting information necessary for the user to fully utilize functions described later and an instruction input unit 206 to be operated by the user to input an instruction while checking the display 204.

The display 204 is formed with a liquid crystal panel or the like provided in a commonly-used camera. An example of a screen to be displayed is described later. The instruction input unit 206 includes a shutter button 206a for capturing an image when pressed by the user, a zoon button 206b for changing a zoon factor, a direction instruction button 206d for selecting a mode or frame displayed on the display 204, and a decision button 206c for inputting a selection decision. The instruction input unit 206 may be realized with a structure that is similar to that of a commonly-used camera.

The image-capturing device 200 may be configured such that two modes can be switched, the two modes being: a normal mode in which the user takes a picture or captures a moving image by releasing the shutter just like in a commonly-used camera; and an image creation support mode for supporting the creation of hierarchical data. Alternatively, a creation support function may be realized by connecting a device that supports image creation to a commonly-used camera. Since the normal mode is the same as in a commonly-used camera, an explanation is hereinafter given regarding the configuration at the time of the image creation support mode.

Figure 7:
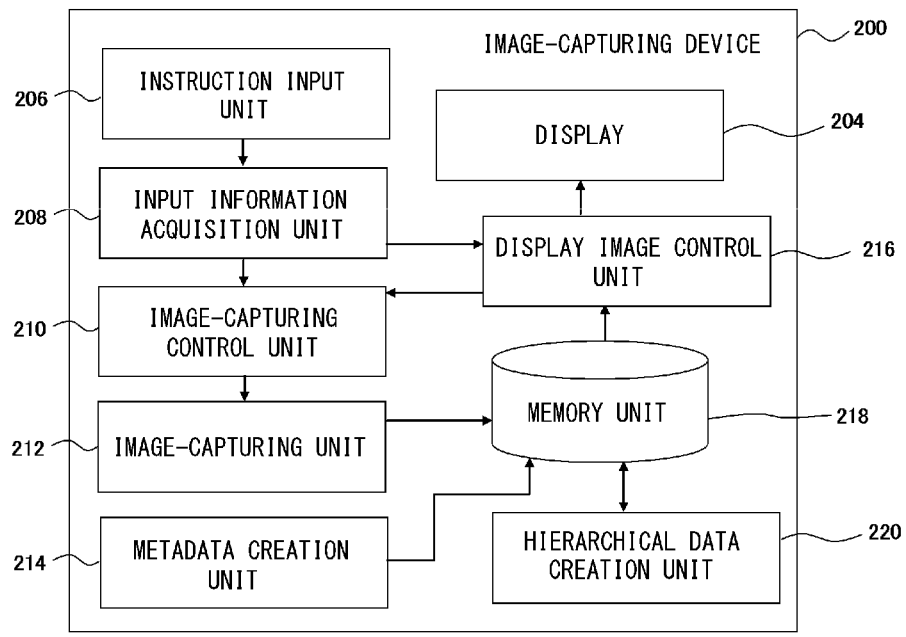
FIG. 7 is a diagram illustrating a detailed configuration of the image-capturing device according to the embodiment.

FIG. 7 illustrates in more details the configuration of the image-capturing device 200. In addition to the above-stated instruction input unit 206 and display 204, the image-capturing device 200 includes an input information acquisition unit 208 for acquiring the details of an instruction input from the user, an image-capturing control unit 210 for controlling the direction and the zoom factors of the image-capturing device to support the creation of image data, an image-capturing unit 212 for actual image capturing, a metadata creation unit 214 for acquiring metadata required for hierarchical data creation, a display image control unit 216 for controlling an image to be displayed on the display 204, and a memory unit 218 for storing image data and metadata. The image-capturing device 200 further includes a hierarchical data creation unit 220 for creating hierarchical data from a captured image, and the memory unit 218 stores created hierarchical data.

The input information acquisition unit 208 interprets operation on the instruction input unit 206 by the user, converts the operation into information necessary for the support, and provides the information to the image-capturing control unit 210. The "information necessary" includes image-capturing conditions such as a zoom factor at the time the user captured an image in addition to a result of selection among options displayed on the display 204. The image-capturing control unit 210 determines an image-capturing condition based on the information necessary for support according to an input from the user and instructs the image-capturing unit 212 to capture an image after controlling the image-capturing device to satisfy the condition. The orientation of a lens and zoom factor of the image-capturing device 200 are to be controlled.

Therefore, the image-capturing control unit 210 is provided with a mechanism of controlling the direction of a lens provided in a commonly-used pan-tilt camera. The image-capturing control unit 210 transmits a signal for controlling a zoon factor to the image-capturing unit 212. The image-capturing control unit 210 may be provided with a mechanism of acquiring positional information using a GPS (Global Positioning System) and a mechanism of acquiring a direction using a gyro sensor, depending on a support method described later. In this case, by notifying the user that determined image-capturing conditions are satisfied as a result of the user moving while holding the image-capturing device 200 and changing the direction of the lens, the user himself/herself can be allowed to release the shutter.

The image-capturing unit 212 captures an image in accordance with an instruction from the image-capturing control unit 210. Image data of a captured picture, moving image, and the like are stored in the memory unit 218. Every time the image-capturing unit 212 captures an image or after a series of images that constitute one hierarchical data set are captured, the metadata creation unit 214 creates metadata to be added to the image data such as the zoom factor of a captured image, the direction of a lens, and information associating images with one another and stores the created metadata in the memory unit 218.

The display image control unit 216 creates a picture of an image captured by the lens and outputs the created picture to the display 204 in real time. The display image control unit 216 further creates image data of a selection screen for the normal mode and the image creation support mode, a selection screen for various support methods in the image creation support mode, a selection screen for a target image described later, or the like and output the created image data to the display 204. Depending on a support method, the display image control unit 216 also analyzes a captured image and detects a target.

The hierarchical data creation unit 220 reads the image data and metadata stored in the memory unit 218 and creates hierarchical data based on the metadata. As described above, a case where an image captured with a different zoom factor is set to a different layer, a case where the image captured with a different zoom factor is set as another hierarchical data set in which a link is defined, a case where images captured at the same zoom factors are put together to form a single layer, or a combination of these cases may be applied to the hierarchical data to be created. Specific examples are described later.

The created hierarchical data is appropriately compressed and then stored in the memory unit 218. A captured image can be displayed by, for example, writing the hierarchical data in a recoding medium or the like and then loading the recoding medium in the recording medium loading unit 52 in FIG. 4. The hierarchical data creation unit 220 may be realized as another device that is independent of other functions. A process of capturing an image and a process of creating hierarchical data may be performed successively in terms of time. Alternatively, the processes may be performed at some other time.

Figure 8:
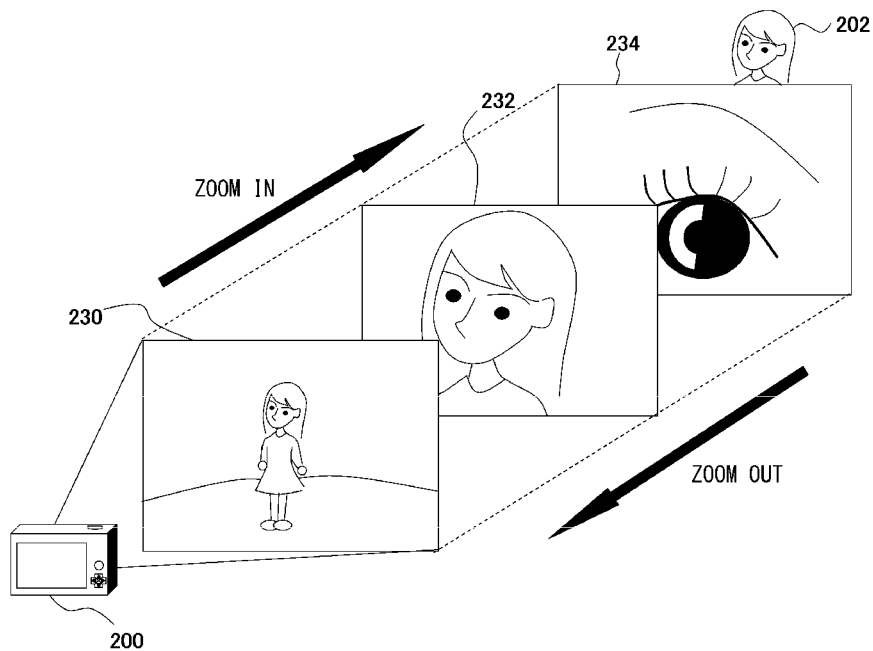
FIG. 8 is a diagram for explaining a basic mode of an image data creation support method according to the embodiment.

FIG. 8 is a diagram for explaining a basic mode of an image data creation support method according to the embodiment. When creating hierarchical data of an image including the subject 202, the image-capturing device 200 acquires, e.g., a first image 230 with the smallest zoom factor, a third image 234 with the maximum zoon factor, and a second image 232 with a zoom factor in the middle as captured images. When actually displaying these images, the first image 230, the third image 234, and the second image can be determined as an initial image, an image desired to be displayed with the highest resolution, and an image in transition, respectively.

In order to achieve such image display, when the first image 230 is determined as a reference image, the image-capturing device 200 acquires relative zoom factors and relative positions of the rest of the images (i.e., the second image 232 and the third image 234) at the time of capturing an image. The image-capturing device 200 associates the first image 230, the second image 232, and the third image 234 with one another so as to show that the images are used as materials of a single hierarchical data set. These information sets are stored as metadata in the memory unit 218 along with image data for which the association is made. The number of images shown in FIG. 8 is for an illustrative purpose. A necessary zoom factor is determined based on a difference in a zoom factor between the first image 230 and the third image 234, an interval between zoom factors that allows for seamless display, and the like.

An order of capturing an image is not particularly restricted for the first image 230, the second image 232, and the third image 234. As described later, the third image may be captured first and then zoomed out to capture the second image and then the first image or vice versa according to a support method to be implemented, the nature of a subject, or user's preferences. Alternatively, after capturing the first image 230, the image may be zoomed in to capture the third image 234 and then zoomed out to capture the second image 232.

When using the first image 230, the second image 232, and the third image 234 as images in different layers of a single hierarchical data set in which a link is not defined, the images are captured with zoom factors of predetermined increments so as to correspond to the resolutions of the respective layers, or the captured images are appropriately enlarged or reduced so as to acquire images with resolutions of predetermined increments. For example, the hierarchical data shown in FIG. 3 comprises four layers, each layer having a scale factor that is twice as much of that of an upper image in lengthwise and crosswise directions. Therefore, when creating such hierarchical data, an image is captured while changing a zoom factor in four stages. At this time, the user may capture either an image with the minimum scale factor or an image with the maximum scale factor, which is a reference image, and images for respective layers may then be captured by changing the zoom factor by a predetermined amount of change by the control by the image-capturing control unit 210 based on the captured reference image. Alternatively, the user may capture the image with the minimum scale factor and the image with the maximum scale factor, and then an image for the remaining layer may be captured with a zoom factor that interpolates a zoom factor for zoom factor interpolation therebetween by the control by the image-capturing control unit 210.

When creating a single hierarchical data set as described, a plurality of pictures may be captured with a single zoom factor. If the zoom factor is N times that of a reference image in lengthwise and crosswise directions, N images in both length wise and crosswise directions, that is, the total of $N^2$ images are captured in succession by controlling a pan tilter as in the case of a panoramic picture. Then, the captured images can be combined so as to form images constituting a single layer. Alternatively, as described above, only an area desired to be displayed with a high resolution may be captured so as to create a layer in which a captured image is arranged at a position corresponding to the area of a reference image.

Any one of the captured images may represent another hierarchical data set in which a link is set. For example, for first hierarchical data formed by the first image 230 and the second image 232 and for second hierarchical data formed by the second image 232 and the third image 234, links are set in the second image 232, which is an image in common. In such a case, a step size of a scale factor can be set in an individual hierarchical data set. Thus, a zoom factor for capturing an image may be determined according to an image desired to be displayed. However, an image for interpolation is appropriately captured such that a gap between the respective zoom factors does not become too large in upper and lower layers.

As described, a mode where a plurality of hierarchical data sets in which a link is defined are created is based on the assumption that particularly an area in which the link is defined is to be enlarged for display. Thus, instead of capturing, at all zoom factors, images of the entire area captured in a reference image, it is only necessary to capture an image of a part of the area by selectively increasing the zoom factor. As described above, image data can then be created where the second image 232 in which a face is enlarged is displayed as an enlargement factor around the face is increased while the first image 230 showing the entire body of a person being the subject 202 is displayed and where the third image 234 in which an eye is enlarged is displayed as the enlargement factor is further increased.

The hierarchical data creation unit 220 assigns captured images to respective layers of the hierarchical data based on information associating images with one another and zoom factors in metadata. Further, the hierarchical data creation unit 220 aligns layers based on the relative positions of the images with respect to a reference image indicated in the metadata and on the position of an object such as the subject 202 or of a feature point of a part of the object acquired by analyzing the images. As the alignment of the positions becomes accurate, the switching of the layers at the time of the display can be seamlessly realized.

The relative positions of the images with respect to a reference image can be calculated, by geometric calculation similar to that in a technique of synthesizing a panoramic image from continuous images, based on the direction information of a lens and the zoom factors controlled by the pan tilter. Alternatively, the relative positions may be calculated based on the direction of the lens and the zoom factors acquired by a gyro sensor. In this case, the relative positions can be calculated even when the user manually changes the direction of the lens. Alternatively, the relative positions may be allowed to be calculated even in the case where the positional information by GPS is acquired and where the user manually moves the image-capturing device so as to change the scale factor of an image. In either case, since the final alignment is carried out based on a feature point in creating hierarchical data, it is only necessary that an approximate relative position is identified at a metadata stage.

Figure 9:
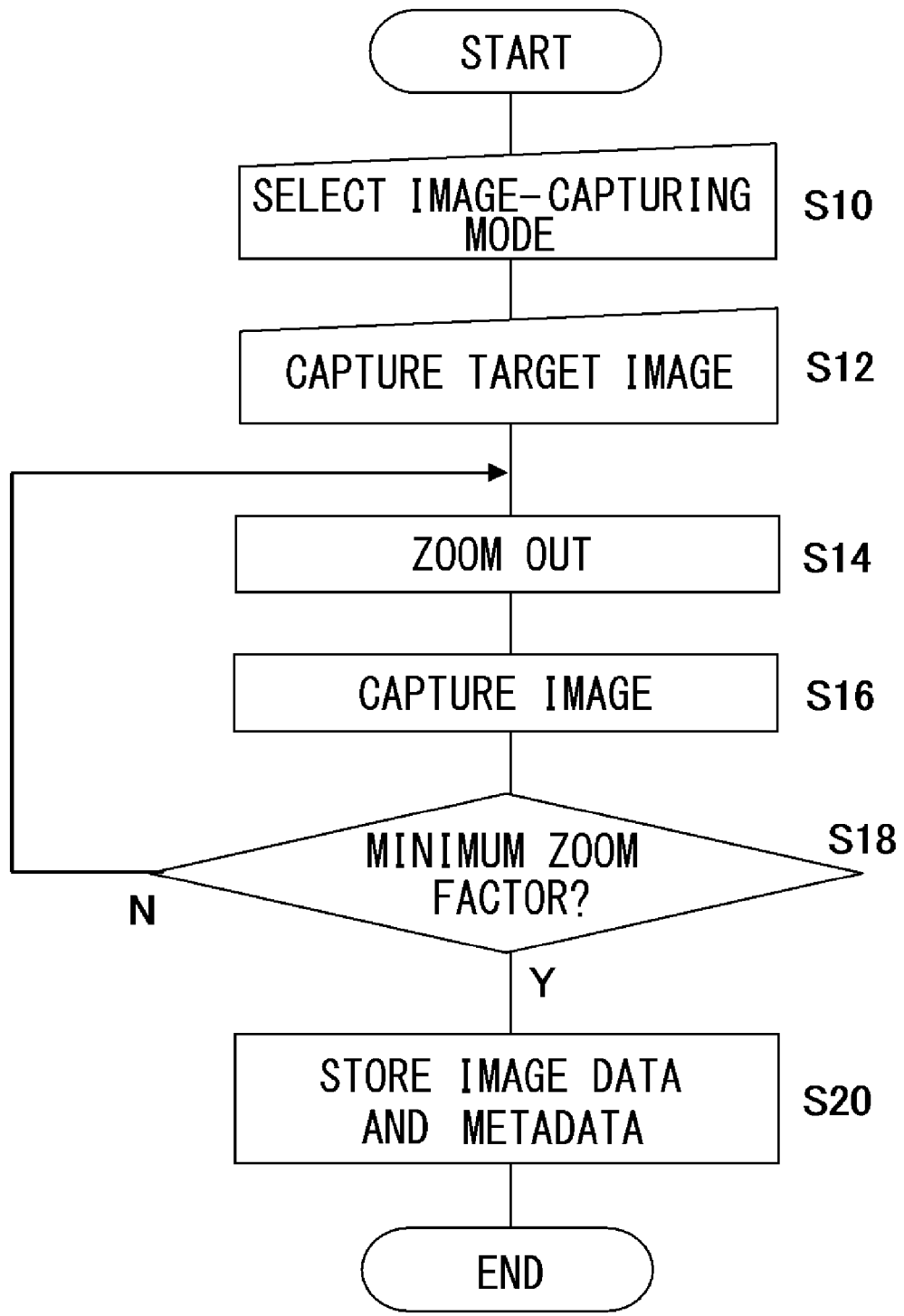
FIG. 9 is a flowchart illustrating an example of a processing procedure for supporting image capturing for creating hierarchical data in the embodiment.

A detailed description will now be made of the operation by the configurations described above. FIG. 9 is a flowchart illustrating an example of a processing procedure for supporting image capturing for creating hierarchical data. This example shows a method of capturing a plurality of images while zooming out, in stages, an initial image captured by the user. The example of FIG. 8 shows the case where the second image 232 and the first image 230 are captured by the image-capturing control unit 210 and the image-capturing unit 212 after the third image 234 of a high scale factor is captured by the user.

By first capturing an image of a high zoom factor and then gradually zooming out the image so as to capture images, an image can be captured, in which an object such as an eye that is desired to be displayed at a high scale factor (hereinafter, the object is referred to as a "target") always fits into the field of view, by merely changing the zoom factor without adjusting the direction of the lens. As the zoom factor becomes smaller, a significant change is less likely to be imposed on an image by some movements. This is particularly important in the case where a target is an insect or animal that moves against the photographer's intentions. In the case of such a target, completing the image capturing in a short period of time by continuously capturing images while changing the zoom factor as in the present embodiment reduces a possibility that the target flies away during the image capturing.

The user first selects an image creation support mode from a mode list displayed on a mode selection screen displayed on the display 204 of the image-capturing device 200 and then enters an input for selecting a mode for performing the support method (S10). The user then captures the image of a target with a desired zoon factor as a target image (S12). The image-capturing control unit 210 then determines the zoom factor for an image to be captured starting from the target image and provides an instruction to capture an image with the determined zoom factor, as described above, so that the image-capturing unit 212 captures the image (S14, S16). The direction of a lens of the image-capturing device 200 at this time may be the same as the direction at the time of the image capturing in S12.

A process of changing the zoom factor and capturing an image is repeated until the smallest zoom factor among determined zoom factors is used (S18:N, S14, and S16). When image capturing of an image of the smallest zoom factor is completed (S18: Y), the metadata creation unit 214 creates metadata and stores the created metadata in the memory unit 218 in relation with the data of the captured image (S20). The metadata creation unit 214 may acquire camera-shake information of the image, positional information of each part of a face detected by a face detection technique, and the like as metadata in addition to those described above. Also, when capturing a plurality of images with the same zoon factor and putting the images together to form a single layer, the number of images captured with the zoom factor is also set as metadata.

Figure 10:
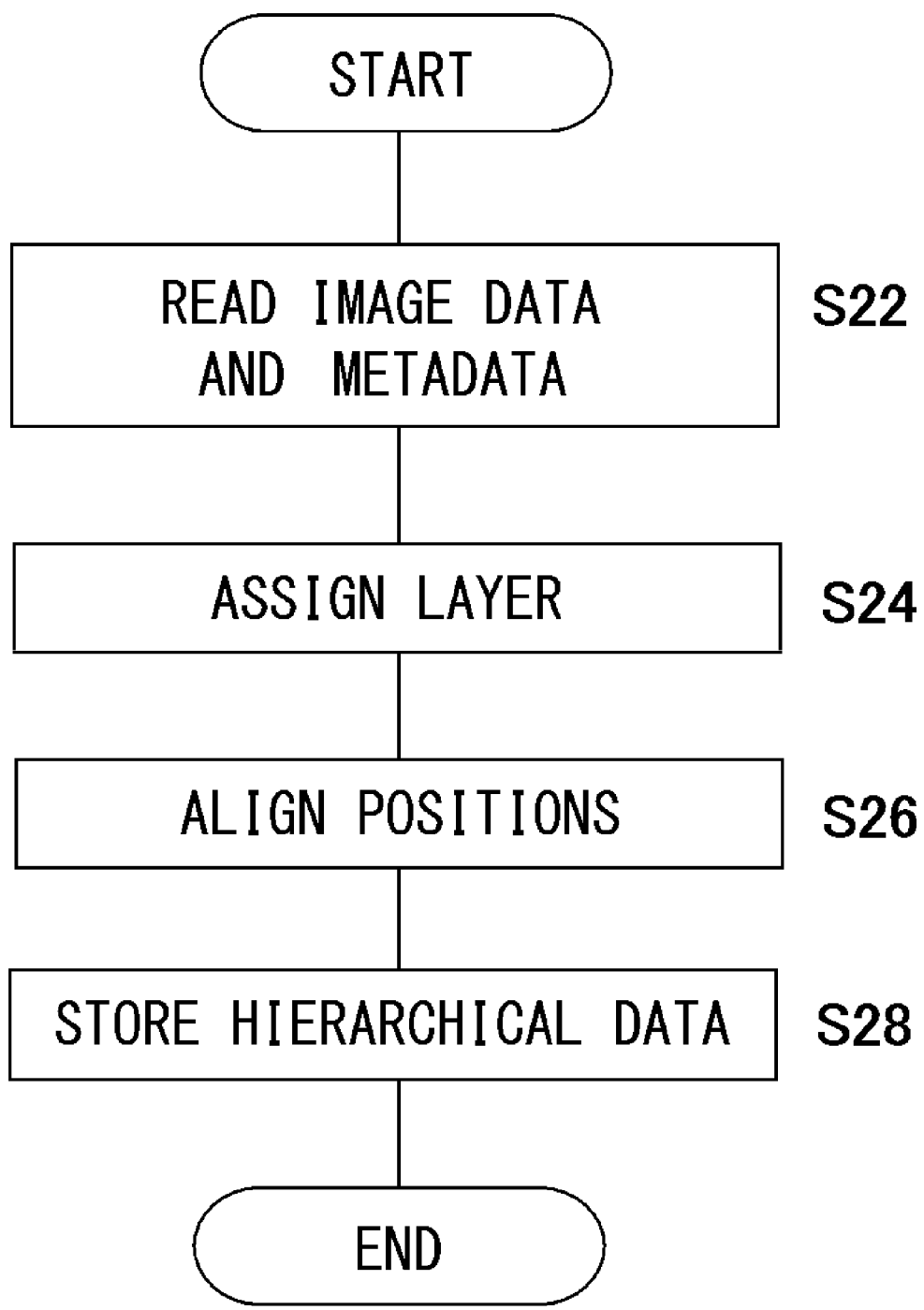
FIG. 10 is a flowchart illustrating a processing procedure for creating hierarchical data in the embodiment.

FIG. 10 is a flowchart illustrating a processing procedure for the hierarchical data creation unit 220 to create hierarchical data using the data of a captured image and metadata. The hierarchical data creation unit 220 reads image data and metadata from the memory unit 218 (S22). The data of images which are associated with each other in the metadata is to be read out. Layers of hierarchical data are then assigned in the order of zoom factors (S24).

Layers of a plurality of hierarchical data sets in which a link is defined may be assigned according to a user's instruction or the like at this time. In this case, a file in which a link is defined is also created by receiving an instruction from the user indicating an image and an area of the image in which the link is defined. When a single layer in which a plurality of images are put together is used, the plurality of images are identified based on the metadata, and a single layer is then assigned to these images.

Then, images in two layers having a hierarchical relationship or a reference image and an image in another layer are aligned by image analysis after approximate corresponding positions are narrowed down based on information of the relative positions in the metadata (S26). For example, an image in a given layer is enlarged to meet the zoom factor of an image in a layer located below, and respective feature points of a same object are compared. The image in the lower layer is then moved in a parallel fashion to align the positions so that a final image in the layer is determined. This is repeated for all layers. With this, a correspondence relationship of tile images among layers can be accurately obtained in a virtual space such as the one shown in FIG. 3.

When a plurality of images constituting a single layer are captured, images captured with a same zoom factor are aligned based on information such as the direction of a lens and put together so as to create a single image. An image captured in the present embodiment basically has the property that the image of a same target is captured in all the zoom factors. Focusing on the target, by using the property to compare the respective positions of feature points of the target, alignment of the positions can be accurately performed among layers and in layers. Hierarchical data thus obtained is stored in the memory unit 218 (S28).

Figure 11:
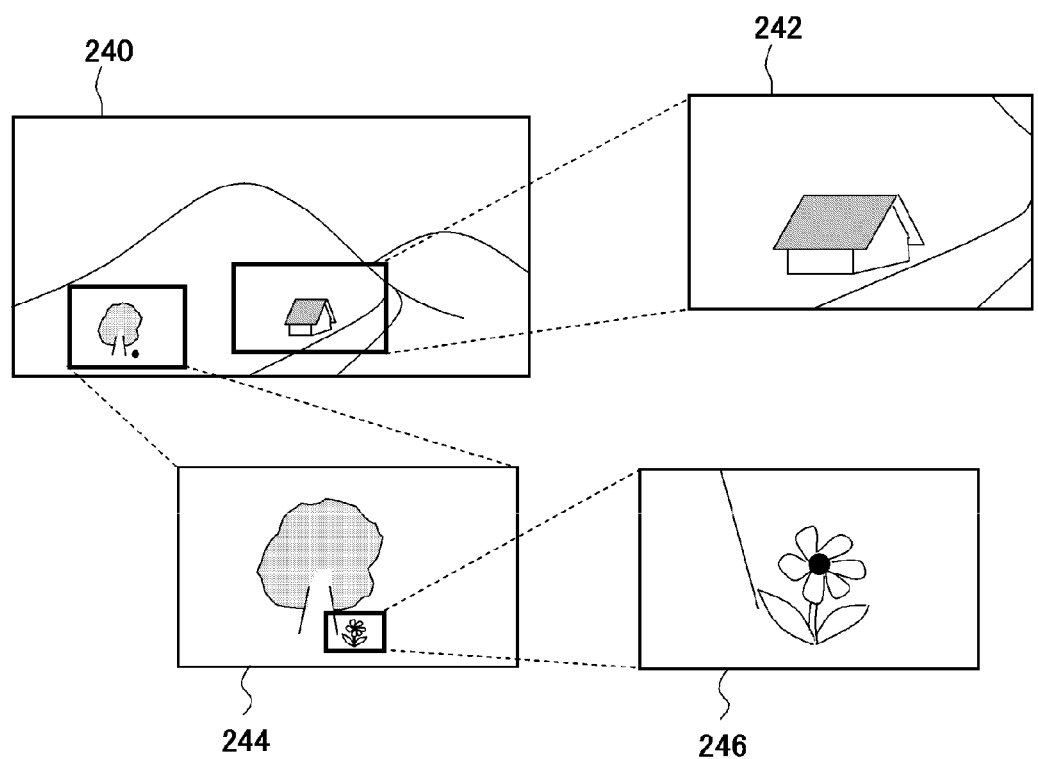
FIG. 11 is diagram for explaining another example of processing for supporting the image capturing for creating hierarchical data in the embodiment.

FIG. 11 is diagram for explaining another example of processing for supporting the image capturing for creating hierarchical data. In this method, an image with a small zoom factor and of the widest angle such as a panoramic image is captured as an initial image 240. The user then selects a target in the initial image 240, zooms in to the target, and captures the target image by himself/herself. An example shown in FIG. 11 shows that an image 242 of a house and an image 244 of a tree in the initial image 240 are captured as target images. The user may further select a target from the target images thus captures and zooms in to the target so as to capture the image thereof. The example shown in FIG. 11 shows that an image 246 of a flower at the base of the tree in the image 244 of the tree is captured as a target image.

It can be considered that images captured in such a mode form a tree structure where the images are connected by a containment relationship with the initial image 240 serving as a root node. In the example shown in FIG. 11, a tree structure is employed where the image 242 of the house and the image 244 of the tree both directly selected from the initial image 240 are connected to the root node, which is the initial image 240, and where the image 246 of the flower is connected to the image 244 of the tree. Hereinafter, an image in an upper node that is connected in such a tree structure is referred to as a parent image, and an image in a lower node that is contained in the parent image is referred to as a child image.

In the method, the metadata creation unit 214 creates a tree structure of image data as metadata. By creating such a tree structure while capturing an image, the hierarchical data creation unit 220 can set a link to a plurality of hierarchical data sets in a single hierarchical data set. For example, when an image around the house is enlarged while the initial image 240 is being displayed, the image can be further enlarged by switching the display to the one that uses the data of the image 242. Similarly, a mode can be realized where, when an image around the tree is enlarged, the display is switched to the one that uses the data of the image 244 and where, when the image of the base of the tree is further enlarged, the display is switched to the one that uses the data of the image 246 so as to display the detailed structure of the flower that is not clearly visible in the initial image 240.

After the user captures a target image such as the image 242 of the house, the image-capturing device 200 captures an interpolated image for the interpolation between the initial image 240 and the target image with respect to a zoom factor. As in the case of the image-capturing procedure explained in FIG. 9, an image-capturing procedure starts with a target image, and the image capturing is repeated while zooming out the target image until the zoom factor of an initial image 240 is used. If a moving object such as a person, an animal, a vehicle, or the like is in the initial image, an image having the same composition as that of the initial image 240 may be captured again so as to be used as hierarchical data. This is because only a short amount of time is required, after the user captures a target image, for capturing images continuously in an automatic manner while the image-capturing device 200 zooms out the target image such that changes in the compositions of a series of images can be reduced compared to those of the initial image 240 captured first.

Figure 12:
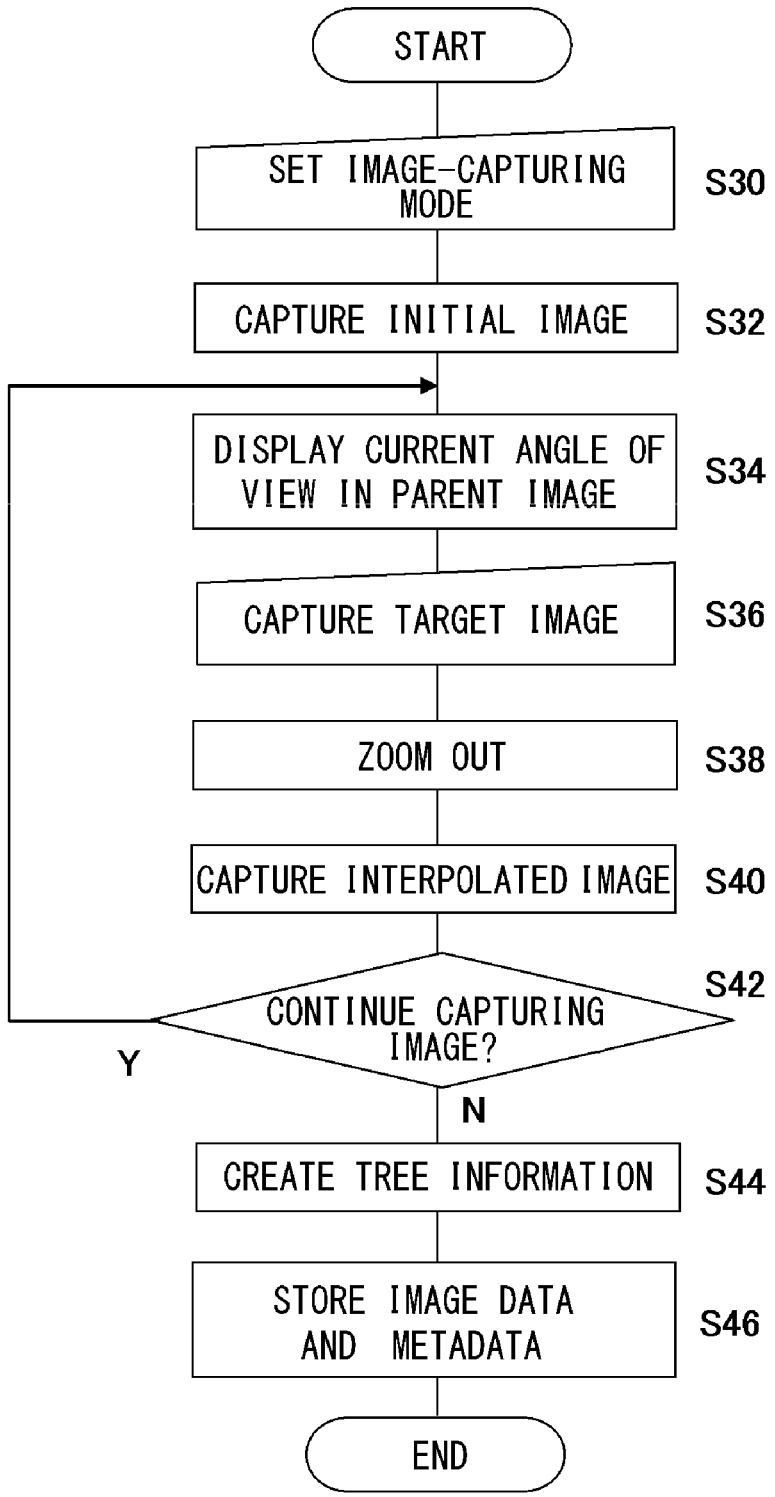
FIG. 12 is a flowchart illustrating a processing procedure for supporting the image capturing in the embodiment.

FIG. 12 is a flowchart illustrating a processing procedure for supporting the image capturing explained in FIG. 11. The user first selects an image creation support mode from a mode list displayed on a mode selection screen displayed on the display 204 of the image-capturing device 200 and then enters an input for selecting a mode for performing the support method (S30). The image-capturing control unit 210 then captures an initial image such as a panoramic image according to information of the angle of view specified by the user at the time of the mode selection, or the like (S32).

For example, the user specifies the respective angles of view for the upper left corner and the lower right corner of a panoramic image, and the image-capturing control unit 210 calculates the angle of view for the entire panoramic image that allows the specified angles of view to be at the upper left and lower right corners, respectively. The image-capturing control unit 210 then controls a pan tilter to move the direction of the camera and allows the image-capturing unit 212 to capture a plurality of images that constitute the panoramic image. The images thus captured are combined together to create the panoramic image. If a single image for which a plurality of images do not need to be combined is used as the initial image, the process in S32 may be performed by the user.

The display image control unit 216 then displays the initial image captured in S32 on the display 204 as a parent image and displays an image indicating, by a rectangle or the like, an area in the initial image that corresponds to the current angle of view captured by the lens on the display 204 (S34). While looking at the display, the user changes the direction and zoom factor of the image-capturing device 200 and captures a desired target image (S36). As explained in FIG. 9, the image-capturing control unit 210 then determines the zoom factor for an image to be captured as an interpolated image and instructs the image-capturing unit 212 to capture an image with the determined zoom factor so that the image-capturing unit 212 captures the interpolated image (S38, S40).

If the user inputs an instruction to continue the image capturing in order to capture another target image or the image of a target further selected from the target image (S42: Y), the processes in S34, S36, S38, and S40 are repeated. If the image of a target is captured in the target image, the display is switched to display the target image serving as a parent image in S34 at this time. When the image capturing of all target images and interpolated images between the target images is finished (S42: N), the metadata creation unit 214 identifies parent-child relationships in the plurality of captured images and creates tree structure information of image data (S44).

Capturing an area in S36 that is displayed by a rectangle in the parent image displayed in S34 and then setting the captured area as a child image allows for the identification of a parent-child relationship. The relative positions of the parent image and the child image are also identified automatically at this time. When an interpolated image is captured in S40, a corresponding node is inserted in the tree structure. Alternatively, the time at which each of the images is captured may be acquired, and the information of the tree structure may be created based on a zoom factor and the direction of the lens for an image captured within a predetermined time period. The metadata creation unit 214 creates metadata including the information of the tree structure and the information of the relative position and stores the created metadata in the memory unit 218 in relation to the data of a captured image (S46).

Figure 13:
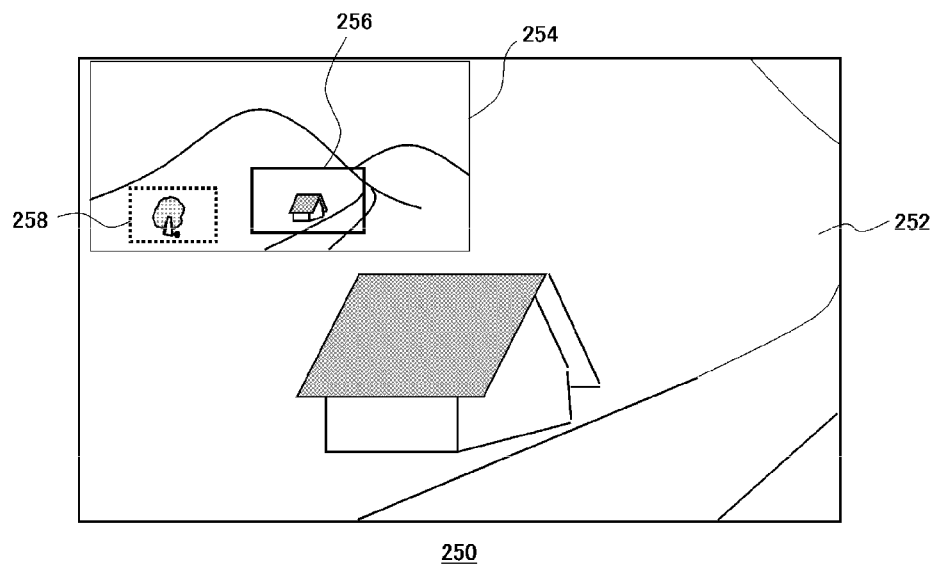
FIG. 13 is a diagram illustrating a configuration example of a screen to be displayed on a display in S34 in FIG. 12.

FIG. 13 is a diagram illustrating a configuration example of a screen to be displayed on the display 204 in S34 in FIG. 12. A target selection screen 250 includes an electronic finder area 252 for displaying an image currently captured by the lens and a parent-image display area 254 for displaying a parent image such as an initial image. The parent-image display area 254 may be arranged such that it overlaps a part of the electronic finder area 252 as shown in the figure, or arranged in an independent area.

The electronic finder area 252 is formed by an electronic finder provided in a commonly-used camera. The parent-image display area 254 displays an already captured image that serves as a parent image for a target image to be captured at the moment. Immediately after an initial image is captured, the parent-image display area 254 displays the initial image as a parent image. In the parent-image display area 254, a current angle-of-view area frame 256 indicating an area, in a parent image, that corresponds to the angle of view currently captured by the lens. An image in an area surrounded by the current angle-of-view area frame 256 corresponds with the image displayed in the electronic finder area 252. Further, in the parent-image display area 254, an already-captured-area frame 258 indicating an area, which has already been captured as a target image, is also displayed by a rectangle or the like.

Different line forms and color are used for the current angle-of-view area frame 256 and the already-captured-area frame 258 so that the frames are distinguishable from each other. In the figure, the former is indicated by a solid line, and the latter is indicated by a dashed line. An initial image may be displayed in the parent-image display area 254 at all times so that, when further capturing the image of a target from a target image, the position of the image of the target in the initial image is clear. In this case, a mode where the current angle-of-view area frame 256 is located inside the already-captured-area frame 258 is employed. Displaying such a screen on the display 204 allows the user to freely select a target from an initial image and also allows the metadata creation unit 214 to clearly obtain the respective relative positions of a parent image and a child image.

The creation of hierarchical data using both the data of an image thus captured and metadata can be achieved by using a processing procedure similar to that explained in FIG. 10. However, as shown in FIG. 11, since a tree structure in which a plurality of child images exist for a single parent image is acceptable, it is necessary to paste images in a plurality of areas in a single layer or to set a link to a plurality of hierarchical data sets in a single hierarchical data set based on the information of the tree structure acquired as metadata. Even when there are a plurality of child images, by aligning the child images with respect to a parent image, the display can be seamlessly changed from an overall landscape, which is the initial image 240 in FIG. 11, to the close up of a flower, which is the target image.

Figure 14:
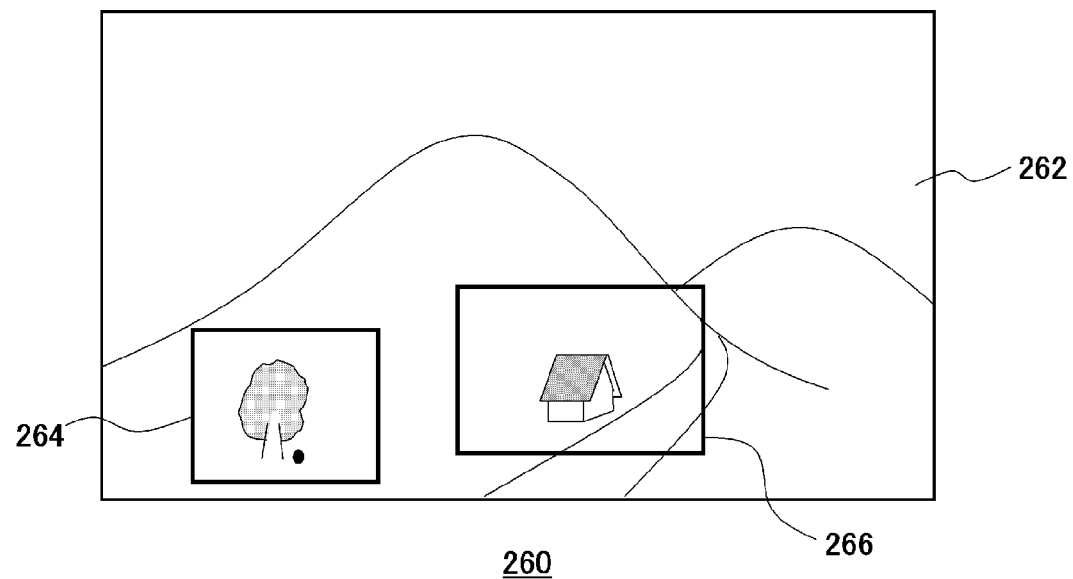
FIG. 14 is a diagram illustrating a configuration example of a screen to be displayed on a display in a mode where the user selects a target image in the embodiment.

In the method explained in FIG. 11 through FIG. 13, a wide-angle initial image such as a panoramic image is first captured, and the user then selects a target by himself/herself so as to capture a target image. On the other hand, after capturing the initial image, the image-capturing device 200 may detect objects that can serve as a target by image analysis and allow the user to select from the detected objects. FIG. 14 illustrates a configuration example of a screen to be displayed on the display 204 in such a mode. A target image selection screen 260 includes a parent-image display area 262 for displaying a parent image such as an initial image.

In the parent-image display area 262, the display image control unit 216 shows an area, in which a person's face, an object, or the like that can serve as a target is detected, with a target image candidate frame 264 or 266 or the like as a result of image analysis of the parent image. A commonly-used image analysis technique such as face detection, foreground extraction, frequency analysis, color histogram, feature-point extraction, pattern matching, or the like can be applied to this image analysis. The user may be allowed to specify, in advance, the attribute of an object desired to be used as a target so as to determine the image analysis technique.

When the user inputs a selection from the target image candidate frames 264 and 266 and the like, the image-capturing control unit 210 changes a pan tilter and a zoom factor to obtain a selected image and the image-capturing unit 212 captures a target image. Instead of the target image selection screen 260 in FIG. 14, only candidates for a target image may be displayed as thumbnail images in an array.

Figure 15:
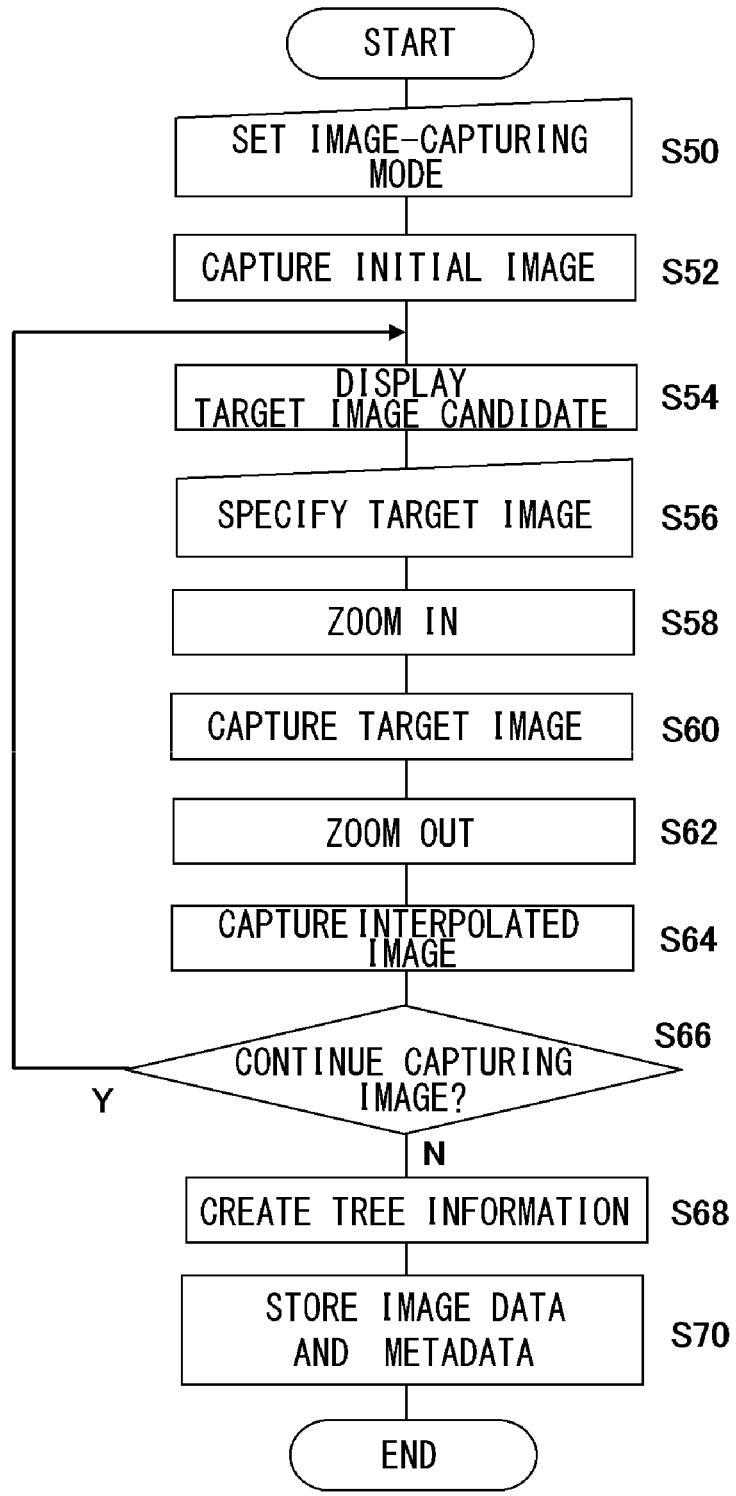
FIG. 15 is a flowchart illustrating a processing procedure for supporting the image capturing explained in FIG. 14.

FIG. 15 is a flowchart illustrating a processing procedure for supporting the image capturing explained in FIG. 14. The user first selects an image creation support mode from a mode list displayed on a mode selection screen displayed on the display 204 of the image-capturing device 200 and then enters an input for selecting a mode for performing the support method (S50). The image-capturing control unit 210 then captures an initial image such as a panoramic image according to information of the angle of view specified by the user at the time of the mode selection, or the like (S52). These processes are the same as those in S30 and S32 in FIG. 12.

The display image control unit 216 then performs image analysis on the captured initial image and displays on the display 204 the initial image in which areas having objects that can serve as a target are surrounded by respective target image candidate frames (S54). The user enters an input for selecting an image candidate frame having a desired target from among displayed target image candidate frames (S56). The image-capturing control unit 210 then increases the zoom factor while moving the pan tilter as necessary to obtain the angle of view that corresponds to the selected frame so that the image-capturing unit 212 captures a target image (S58, S60).

The user may perform the processes in S58 and S60 by himself/herself. In this case, the user adjusts the direction of the lens and the zoom factor towards the target while holding the image-capturing device 200. Then, after the image-capturing control unit 210 makes fine adjustment, the image-capturing unit 212 may capture the image; alternatively, the user may be notified by a sound or display in the middle of changing the zoom factor, etc., that the angle of view being captured by the lens has come to correspond to the selected frame, allowing the user to capture the image.

As explained in FIG. 9, the image-capturing control unit 210 then determines the zoom factor for an image to be captured as an interpolated image and gives an instruction to capture an image with the determined zoom factor so that the image-capturing unit 212 captures the interpolated image (S62, S64). If the user inputs an instruction to capture another target image (S66: Y), the processes in S54 and S64 are repeated. If there is a target desired to be captured with an increased scale factor in the target image, the user may enter an instruction input indicating this information accordingly so that the image displayed in S54 is replaced with the target image serving as a parent image.

As in the case of S44 in FIG. 12, when the image capturing of all target images and interpolated images between the target images is finished (S66: N), the metadata creation unit 214 identifies parent-child relationships in the plurality of captured images and creates tree structure information of the image data (S68). Along with other metadata such as relative position information, the metadata creation unit 214 stores the created tree structure information of the image data in the memory unit 218 in relation to the data of a captured image (S70).

In this method, candidate target images are displayed, and the user selects a target image from among the candidate target images. However, a pattern candidate for an image desired to be displayed may be prepared in advance so that the user makes a selection at the time of setting an image-capturing mode in S50. For example, versatile patterns such as a pattern showing a transition from the entire image of a person to a face and then to an eye, a pattern showing a transition from landscape to a person and then to a face, and the like are prepared and stored in the memory unit 218. The user then selects one of the patterns at the time of setting the image-capturing mode and arranges the person or the landscape, which is a subject, in front of the lens of the image-capturing device 200.

The image-capturing control unit 210 and the image-capturing unit 212 then capture an image of the widest angle based on the selected pattern in S52 in FIG. 15. Then, instead of the processes in S54 and S56, the display image control unit 216 analyzes the captured image, extracts a target according to the selected pattern, and determines the angle of view of a target image. Subsequent processes are the same as those in FIG. 15. With this, the data of an image suitable for a display mode the user imagines can be acquired with the minimum amount of effort of the user. A sample image may be displayed on the display 204 at the time of the pattern selection so that display that is available can be imagined.

The embodiment described above supports the image capturing of an image and the creation of hierarchical data that are suitable for a hierarchical data display technique that allows a single image to be displayed in a wide range of resolutions or that allows the display to be seamlessly switched to display another image. More specifically, images including a subject serving as a target are captured in succession while changing the zoom factor. With this, data of a series of images with little change in lighting, displacement of an object, or the like can be obtained. Thus, even when the data of an image used for display is switched by the enlargement or reduction of the image at the time of display, a seamless transition can be achieved without letting the viewer notice the switching.

Also, acquiring the relative position information and zoom factor of each image as metadata in advance at the same time of the image capturing allows for the assignment of hierarchical data layers and the setting of a link with a little burden on the user. By including the position and direction of an image-capturing device obtained by GPS or a gyro sensor as metadata in addition to these data sets, approximate alignment of images can be performed even when the user moves with the image-capturing device. A problem where the position of an object becomes slightly out of alignment due to the switching of image data at the time of display can be prevented by performing accurate alignment by feature-point extraction after the approximate alignment of the images. Further, even when image capturing is carried out many times using the same image-capturing device, the extraction of a series of images for creating a single hierarchical data set can be easily performed by including a parent-child relationship as metadata and by capturing images at a closely spaced time interval.

Described above is an explanation of the present invention based on the embodiment. The embodiment is intended to be illustrative only, and it will be obvious to those skilled in the art that various modifications to constituting elements and processes could be developed and that such modifications are also within the scope of the present invention.

For example, the figures shown in the embodiment exemplify pictures, which are still images. However, images captured by an image-capturing device may be moving images or a mixture of moving images and still images. For example, a wide-angle image can be set to be a picture, and a target image with a maximized zoom factor can be set to be a moving image. In this case, in an area of a wide-angle image in which a moving image is captured, data in which a link for reproducing the moving image is defined is created. Then, image data can be easily created that achieves effective expression where a still image and a moving image coexist, for example, where a train that is a part of a landscape picture starts moving as the display is enlarged from the landscape picture to display a railway track.

In the embodiment, images acquired by continuous image capturing in a short period of time are set to be a single hierarchical data set. Instead, an interval for image capturing may be set to be long. For example, a same landscape image is captured for each season, and a season to be displayed is switched by a request for moving a display area at the time of display. In this case, the position and direction of an image-capturing device acquired by GPS and a gyro sensor are acquired in advance as metadata at the time of image capturing. Then, by calling the data of an image captured by the previous season and the metadata thereof, image capturing is performed with the same angle of view as that of the image. Then, by associating the images with one another and storing the images in a memory unit, hierarchical data can be created in the same way as that explained in the embodiment.

DESCRIPTION OF THE REFERENCE NUMERALS

1 Image Processing System
10 Image Processing Device
12 Display Device
20 Input Device
30 0-th Layer
32 First Layer
34 Second Layer
36 Third Layer
38 Tile Image
44 Display Processing Unit
50 Hard Disk Drive
60 Main Memory
70 buffer Memory
100 Control Unit
200 Image-Capturing Device
204 Display
206 Instruction Input Unit
208 Input Information Acquisition Unit
210 Image-Capturing Control Unit
212 Image-Capturing Unit
214 Metadata Creation Unit
216 Display Image Control Unit
218 Memory Unit
220 Hierarchical Data Creation Unit As described above, the present invention is applicable to an information processing device such as an image-capturing device, an image processing device, and the like.

The invention claimed is:

1. An image data creation support device for supporting creation of image data used by a display device in which data of a plurality of images that have been captured at a plurality of different zoom factors are interchangeably used as the data of an image to be displayed at a predetermined scale ratio when enlarging or reducing a display image, comprising:
   an image-capturing unit configured to capture a plurality of images of an object at a plurality of zoom factors which are required when displaying the display image
   a metadata creation unit configured to: (i) obtain metadata which associates the plurality of images captured by the image-capturing unit with one another and includes relative position information which indicates positional relationship between respective areas of the plurality of images based on capturing conditions and the zoom factors of the respective plurality of images, the metadata being used for determining an order and timing for switching the display image, and (ii) store the metadata with the plurality of images in a memory device; and a hierarchical data creation unit configured to create, as the image data, hierarchical data obtained by hierarchizing the plurality of images in an order according to the zoom factors included in the metadata, and by aligning the plurality of images in respective layers in the hierarchical data by using the relative position information included in the metadata.

2. The image data creation support device according to claim 1, wherein the hierarchical data creation unit is further configured to align the plurality of images in respective layers in the hierarchical data by analyzing the plurality of images, and extracting respective feature points of a same object in the plurality of images, so that the respective positions of the feature points have correspondence when the plurality of images in respective layers have a size that is the same by enlarging or reducing.

3. The image data creation support device according to claim 1, further comprising:
an image-capturing control unit configured to control a direction of a lens provided in the image-capturing unit,
wherein the metadata creation unit is further configured to acquire, as the relative position information, relative position of each of the plurality of images with respect to a reference image with a smallest zoom factor based on the zoom factor and the direction of the lens at a time of capturing each of the plurality of images by the image-capturing unit.

4. The image data creation support device according to claim 1, further comprising:
a gyro sensor configured to identify a direction of the image data creation support device,
wherein the metadata creation unit is further configured to acquire, as the relative position information, a relative position of each of the plurality of images with respect to a reference image with a smallest zoom factor based on the zoom factor and the direction of the image data creation support device measured by the gyro sensor at a time of capturing each of the plurality of images by the image-capturing unit.

5. The image data creation support device according to claim 1, further comprising:
a radio reception unit of a GPS (Global Positioning System) configured to identify a position of the image data creation support device,
wherein the metadata creation unit is further configured to acquire, as the relative position information, a relative position of each of the plurality of images with respect to a reference image with a smallest zoom factor based on the zoom factor and the position of the image data creation support device measured by the radio reception unit at a time of capturing each of the plurality of images by the image-capturing unit.

6. The image data creation support device according to claim 1, further comprising:
an input information acquisition unit configured to receive an input from the user specifying an angle of view of an image with a smallest zoom factor,
wherein the image-capturing unit captures an initial image with the angle of view received by the input information acquisition unit, and
wherein the input information acquisition unit receives, as the object, an area selected by the user from the initial image as a target.

7. The image data creation support device according to claim 1, further comprising:

an input information acquisition unit configured to receive an input from the user specifying the angle of view of an image with a smallest zoom factor,
wherein the image-capturing unit captures an initial image with the angle of view and received by the input information acquisition unit,
wherein the input information acquisition unit receives, as the object, a region selected by the user from among candidate regions of targets, which are extracted as a result of analyzing the initial image.

8. The image data creation support device according to claim 1, wherein the image-capturing unit captures as any one of the plurality of images a moving image of the object.

9. The image data creation support device according to claim 1, further comprising:
an input information acquisition unit configured to acquire a pattern determining how the object is captured, which is selected by the user from among patterns prepared in advance,
wherein the image-capturing unit captures the plurality of images after determining the zoom factors acquired for capturing the object according to the selected pattern based on the object placed in front of the lens.

10. The image data creation support device according to claim 6, further comprising a display configured to display an image in which a frame of the angle of view captured by the lens is displayed on the initial image in order for the user to select a target from the initial image.

11. The image data creation support device according to claim 6, wherein the image-capturing unit captures an interpolated image for zoom factor interpolation between the zoom factor of the initial image and the zoom factor when a region selected by the user from the initial image is captured.

12. The image data creation support device according to claim 6,
wherein the input information acquisition unit receives specification of a plurality of regions in the initial image, and
wherein the metadata creation unit acquires, as metadata, information of a tree structure of the image data that associates the plurality of images captured by the image-capturing unit with one another, the tree structure having the initial image as a root node.

13. The image data creation support device according to claim 7, further comprising a display configured to display an image in which a frame indicating a contour of the candidate regions of targets is displayed on the initial image in order for the user to enter an input for making the selection.

14. The image data creation support device according to claim 7, further comprising a display configured to display an image in which the candidate regions are displayed as thumbnails in order for the user to enter an input for making the selection.

15. An image data creation support method for supporting creation of image data used by a display device in which data of a plurality of images that have been captured at a plurality of different zoom factors are interchangeably used as the data of an image to be displayed at a predetermined scale ratio when enlarging or reducing a display image, comprising:
capturing a plurality of images of an object at a plurality of zoom factors which are required when displaying the display image;
acquiring metadata which associates the plurality of images with one another and includes relative position information which indicates positional relationship between respective areas of the plurality of images based on capturing conditions and the zoom factors of the respective plurality of images, the metadata being used for determining an order and timing for switching the display image, and storing the metadata with the plurality of images in a memory device; and creating, as the image data, hierarchical data obtained by hierarchizing the plurality of images in an order according to the zoom factors included in the metadata, and by aligning the plurality of images in respective layers in the hierarchical data by using the relative position information included in the metadata and then storing the hierarchical data in a memory device.

16. A computer program embedded in a non-transitory computer readable recording medium, which realizes support for creation of image data used by a display device in which data of a plurality of images that have been captured at a plurality of different zoom factors are interchangeably used as the data of an image to be displayed at a predetermined scale ratio when enlarging or reducing a display image, comprising:

a module configured to capture a plurality of images of an object at a plurality of zoom factors which are required when displaying the display image;

a module configured to acquire metadata which associates the plurality of images with one another and includes relative position information which indicates positional relationship between respective areas of the plurality of images based on capturing conditions and the zoom factors of the respective plurality of images, the metadata being used for determining an order and timing for switching the display image; and a module configured to create, as the image data, hierarchical data obtained by hierarchizing the plurality of images in an order according to the zoom factors included in the metadata, and by aligning the plurality of images in respective layers in the hierarchical data by using the relative position information included in the metadata and then storing the hierarchical data in a memory device.

17. A non-transitory computer-readable recording medium having embodied thereon a computer program product, which realizes support for creation of image data used by a display device in which data of a plurality of images that have been captured at a plurality of different zoom factors are interchangeably used as the data of an image to be displayed at a predetermined scale ratio when enlarging or reducing a display image, comprising:

a module configured to capture a plurality of images of an object at a plurality of zoom factors which are required when displaying the display image;

a module configured to acquire metadata which associates the plurality of images with one another and includes relative position information which indicates positional relationship between respective areas of the plurality of images based on capturing conditions and the zoom factors of the respective plurality of images, the metadata being used for determining an order and timing for switching the display image; and a module configured to create, as the image data, hierarchical data obtained by hierarchizing the plurality of images in an order according to the zoom factors included in the metadata, and by aligning the plurality of images in respective layers in the hierarchical data by using the relative position information included in the metadata and then storing the hierarchical data in a memory device.

* * * * *